(12) United States Patent
Hiratomo (10) Patent No.: US 8,164,910 B2
(45) Date of Patent: Apr. 24, 2012

(54) ELECTRONIC DEVICE

(75) Inventor: Shinji Hiratomo, Oume (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/899,408

(22) Filed: Oct. 6, 2010

(65) Prior Publication Data

US 2011/0157823 A1 Jun. 30, 2011

(30) Foreign Application Priority Data

Dec. 28, 2009 (JP) ................................. 2009-298439

(51) Int. Cl.
*H05K 5/00* (2006.01)
(52) U.S. Cl. .................... 361/730; 361/807; 361/810
(58) Field of Classification Search ............... 312/223.1, 312/223.2; 361/600, 730, 752, 796, 797, 361/800, 807, 810, 823, 784; 439/387, 391, 439/409, 449, 460, 625, 626, 660, 701, 709; 174/50, 53, 520
See application file for complete search history.

(56) References Cited

U.S. PATENT DOCUMENTS

| | | | |
|---|---|---|---|
| 6,456,499 B1 * | 9/2002 | Nakajima et al. | 361/752 |
| 6,687,123 B2 * | 2/2004 | Kitahara | 361/695 |
| 7,505,262 B2 * | 3/2009 | Mizuno et al. | 361/679.33 |
| 7,948,752 B2 * | 5/2011 | Tatsukami et al. | 361/679.58 |
| 7,965,518 B2 * | 6/2011 | Yoshida | 361/796 |

FOREIGN PATENT DOCUMENTS

| | | |
|---|---|---|
| JP | U 03-41978 | 4/1991 |
| JP | 09-116276 A | 5/1997 |
| JP | 2002-149279 A | 5/2002 |
| JP | 2007-299883 A | 11/2007 |
| JP | 2008-041078 A | 2/2008 |
| JP | 2009-163296 A | 7/2009 |

OTHER PUBLICATIONS

Notice of Reasons for Rejection mailed by Japan Patent Office on Dec. 14, 2010 in the corresponding Japanese patent application No. 2009-298439.

* cited by examiner

*Primary Examiner* — Hung S Bui
(74) *Attorney, Agent, or Firm* — Knobbe, Martens, Olson & Bear LLP (57) ABSTRACT

According to one embodiment, an electronic device includes a housing, a wiring, a wiring holder, and a wall portion. The housing houses a plurality of components including a first component and a second component located near the first component The wiring is installed around the second component in the housing and connected to at least one of the components. The wiring holder is located around the second component in the housing to hold the wiring. The wall portion includes a cover that covers the second component and an opening. The opening includes a first area where the first component is exposed and a second area where a periphery of the wiring holder is exposed. The second area is formed around the cover continuously from the first area.

13 Claims, 9 Drawing Sheets

ELECTRONIC DEVICE

CROSS-REFERENCE TO RELATED APPLICATIONS

This application is based upon and claims the benefit of priority from Japanese Patent Application No. 2009-298439, filed Dec. 28, 2009, the entire contents of which are incorporated herein by reference.

FIELD

Embodiments described herein relate generally to an electronic device.

BACKGROUND

Generally, electronic devices such as, for example, personal computers are provided with a memory, a fan, and the like in the housing, and a key board on the housing.

Among the electronic devices is the one provided with an opening for memory access that is covered by a cover on the bottom wall of the housing. The opening for memory access allows access to the memory from the outside of the housing upon, for example, installing a component in the housing. Such an electronic device is also provided with an opening that is covered by a keyboard on the top wall of the housing. The top-wall opening allows access to the circuit board having a memory mounted thereon.

Besides, among a plurality of wirings in the housing, there is a wiring that is routed along the outer surface of a relatively large component such as a fan near the bottom wall of the housing. The housing is provided with a wiring holder at the bottom wall to hold the wiring. Wiring work to attach the wiring to the wiring holder is performed, for example, through the opening formed on the top wall of the housing. For example, Japanese Patent Application Publication (KOKAI) No. 2007-299883 discloses a hook as a conventional wiring holder.

It is difficult to perform the wiring work through the top wall of the housing for a wiring located near the bottom wall inside the housing. Meanwhile, in the case where an opening dedicated to wiring is provided on the bottom wall, the opening cannot be formed in a sufficient size due to the layout of the components in the housing, a decrease in the rigidity of the housing, and the like. This results in poor workability.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a housing, a wiring, a wiring holder, and a wall portion. The housing is configured to house a plurality of components including a first component and a second component located near the first component. The wiring is configured to be installed around the second component in the housing and connected to at least one of the components. The wiring holder is located around the second component in the housing to hold the wiring. The wall portion comprises a cover that covers the second component and an opening. The opening comprises a first area where the first component is exposed and a second area where a periphery of the wiring holder is exposed. The second area is formed around the cover continuously from the first area.

According to another embodiment, an electronic device comprises a housing, a first component, a second component, and a wiring. The housing includes a wall portion provided with an opening. The first component is housed in the housing and is exposed from the opening. The second component is housed in the housing and is located near the first component. The wiring is configured to be routed around the second component. The opening comprises a first area and a second area. The first area has a shape of a rectangle in a size larger than an outer peripheral size of the first component. The second area extends along a periphery of the second component from the first area. The wiring includes a portion routed along the periphery of the second component and exposed from the second area.

According to still another embodiment, an electronic device comprises a component, a fan case, a housing, a wall portion, and a wiring. The housing is configured to house the component and the fan case. The wall portion is part of the bottom wall of the housing. The wall portion comprises an opening to expose the component, which includes a periphery extending along a periphery of the fan case. The wiring is configured to be routed along the periphery of the fan case and partly exposed from the opening.

It is noted that like parts appearing in several views of the drawings will bear like reference numerals.

With reference to FIGS. 1 to 8, a description will be given of an electronic device 1 according to a first embodiment.

Figure 1:
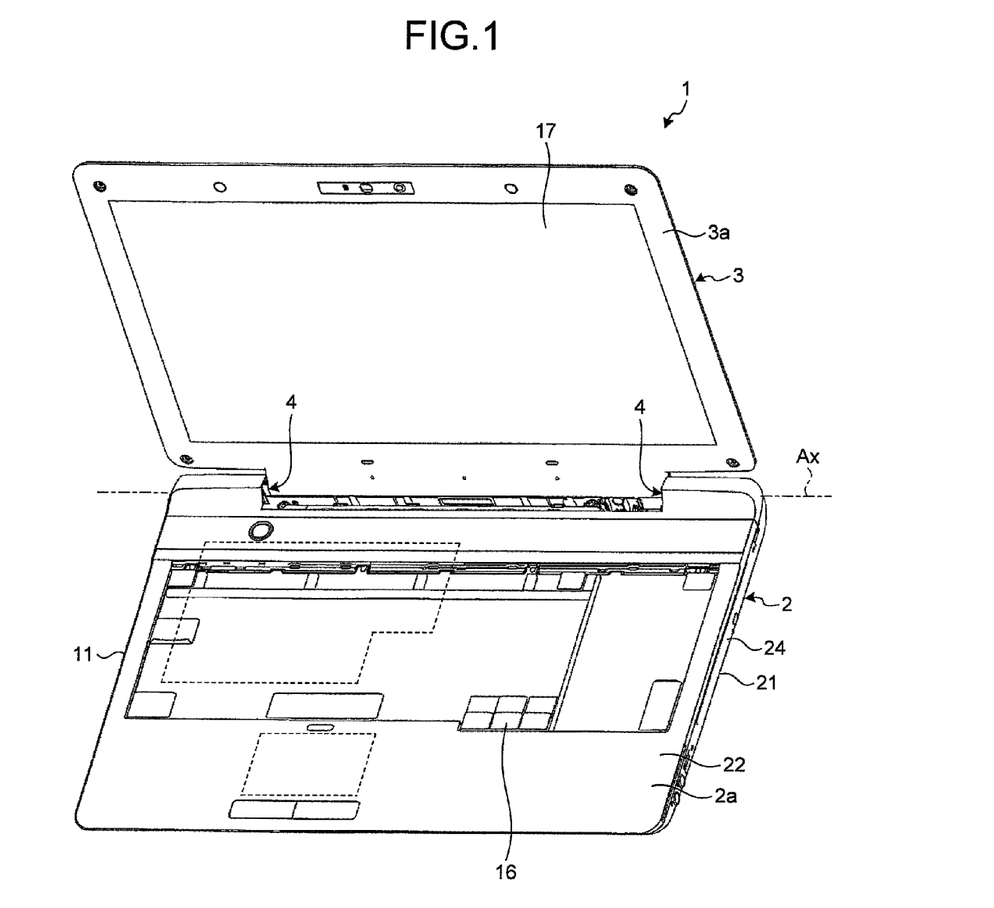
FIG. 1 is an exemplary perspective view of an electronic device according to a first embodiment.

As illustrated in FIG. 1, the electronic device 1 of the first embodiment is, for example, a notebook personal computer. The electronic device 1 comprises a flat rectangular first body 2 and a flat rectangular second body 3. The first body 2 and the second body 3 are connected by a hinge mechanism 4 to be relatively rotatable about a rotation axis Ax at least between a closed position (not illustrated) and an open position (FIG. 1).

Figure 2:
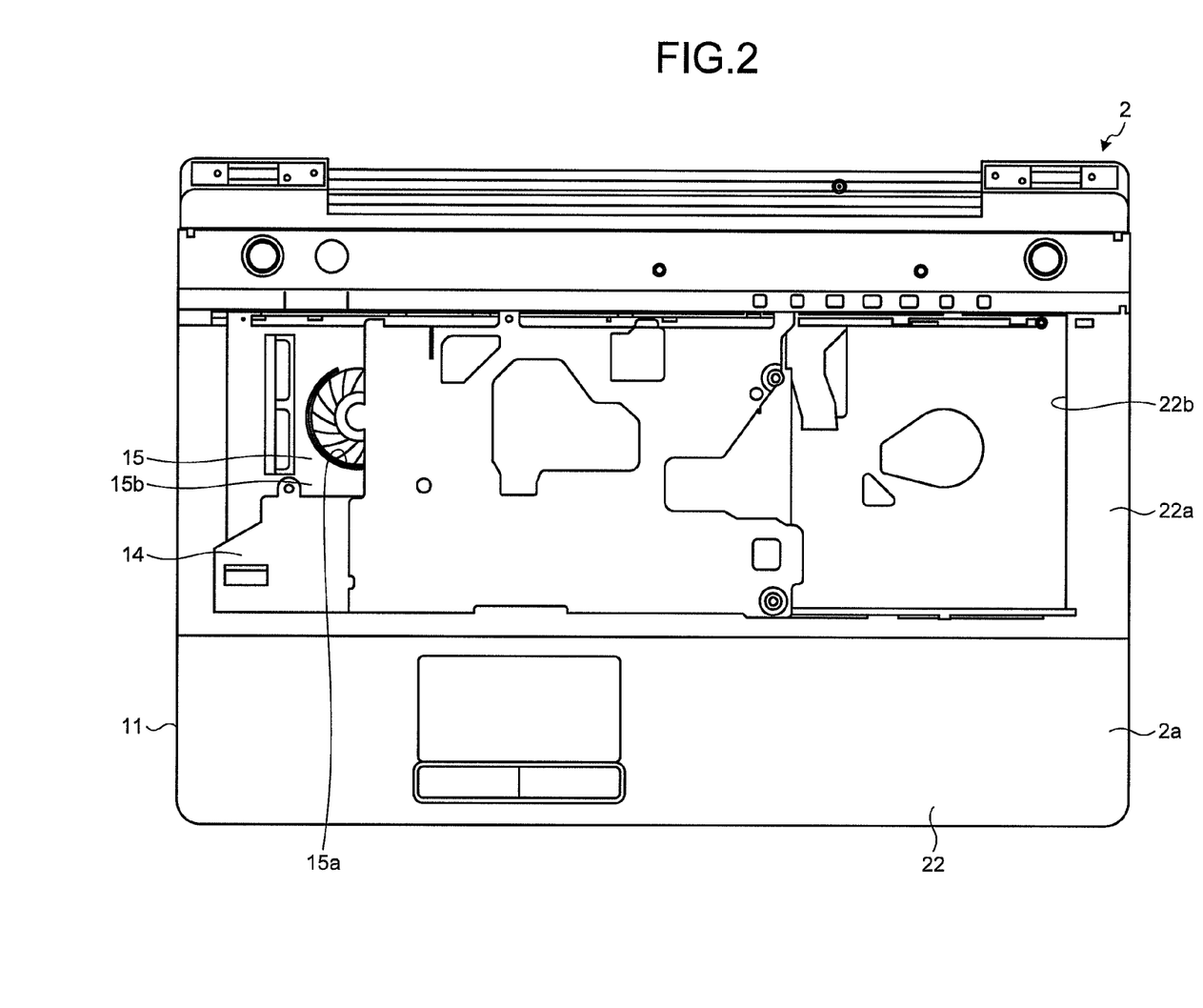
FIG. 2 is an exemplary plan view of the electronic device from which a keyboard is removed in the first embodiment.
Figure 3:
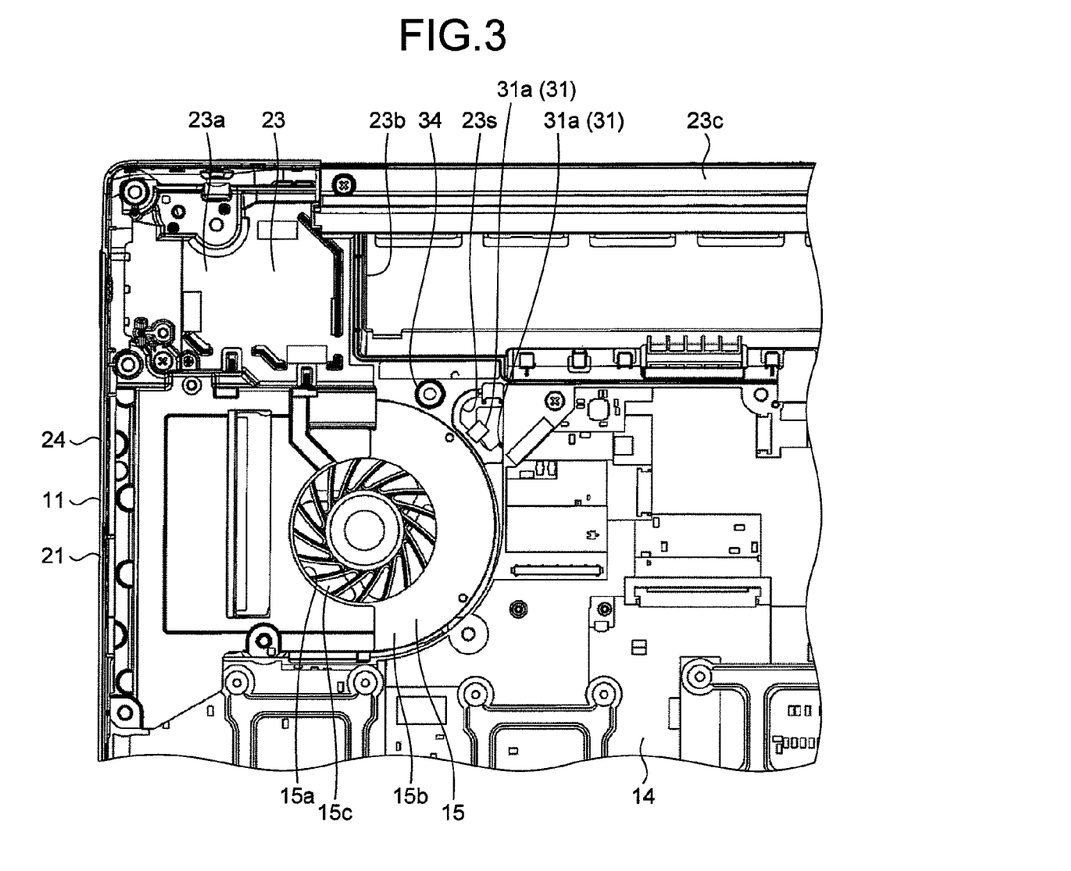
FIG. 3 is an exemplary plan view of part of the inside of a first body in the first embodiment.
Figure 5:
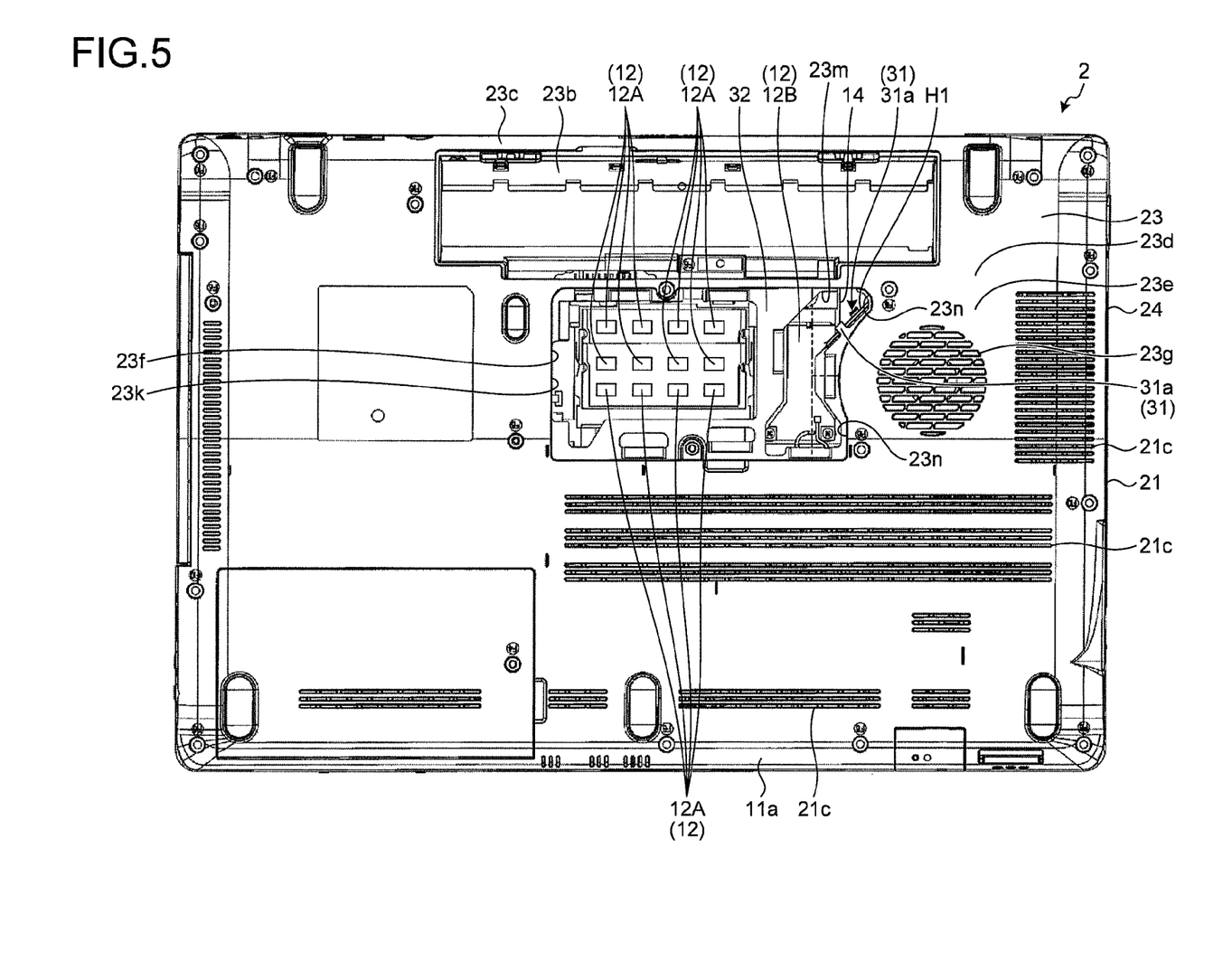
FIG. 5 is an exemplary view of the bottom of the first body from which a cover is removed in the first embodiment.
Figure 6:
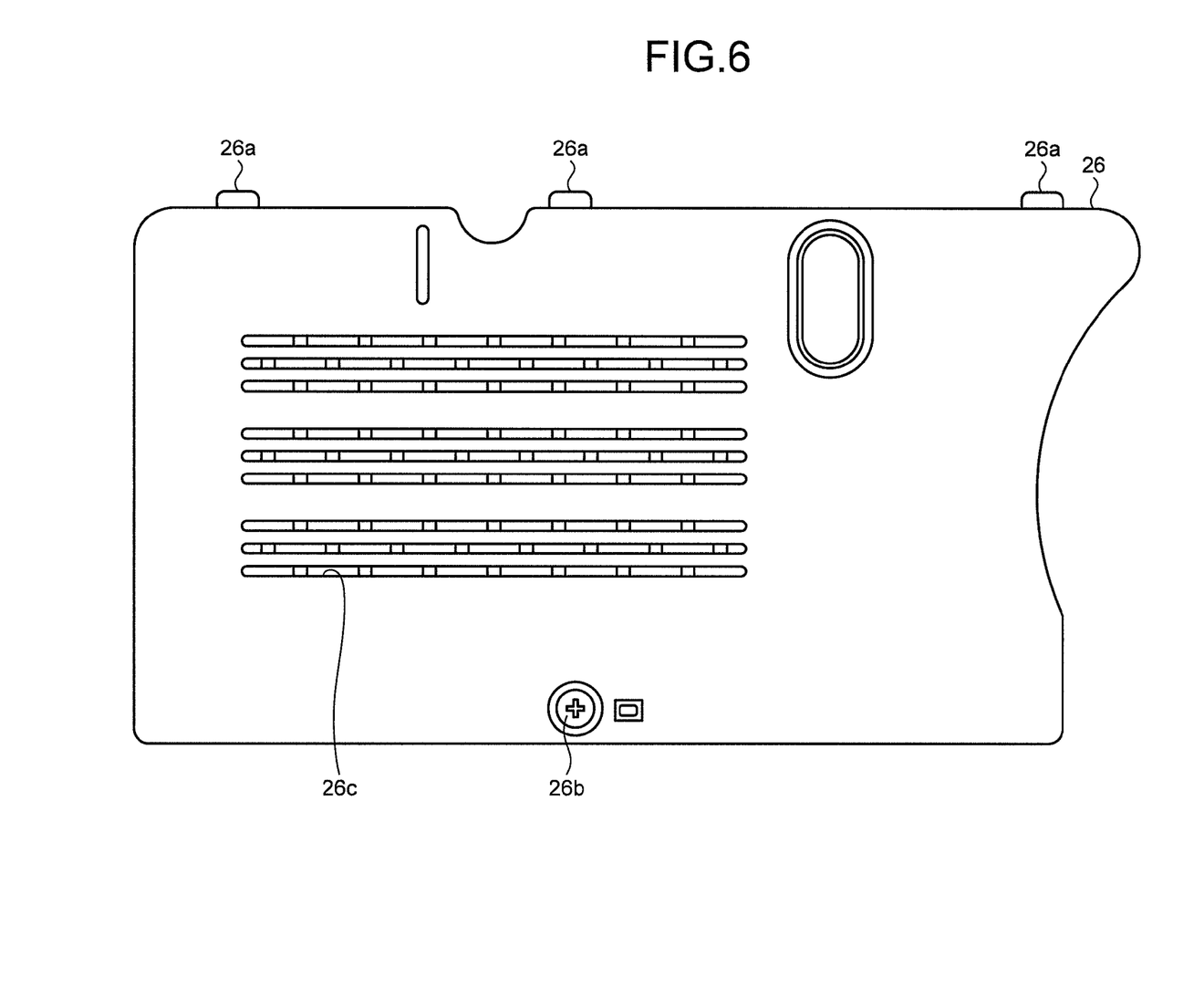
FIG. 6 is an exemplary view of the cover in the first embodiment.

As illustrated in FIGS. 2, 3, and 5, the first body 2 comprises a circuit board 14, a fan unit 15 as a second component, a hard disk, and the like. The circuit board 14 is mounted with plurality of electronic components such as a central processing unit (CPU), a plurality of memories 12A as being included in a first component 12 (see FIG. 5), a wireless module 12B as being included in the first component 12 (see FIG. 5), and the like. The first body 2 is provided with a keyboard 16 as an input device on a front surface 2*a*. On the other hand, the second body 3 is provided with a display device 17 such as a liquid crystal display (LCD) panel on a front surface 3*a*. When the first body 2 and the second body 3 are in the closed position, the front surface 2*a* of the first body 2 faces the front surface 3*a* of the second body 3, and the keyboard 16 faces the display device 17. On the other hand, in the open position, the front surfaces 2*b* and 3*b* are exposed as illustrated in FIG. 1, and the keyboard 16 and the display device 17 are exposed to allow the user to use them. The keyboard 16 and the display device 17 are electronic components. In the following, if it is not necessary to distinguish between the memories 12A and the wireless module 12B, they will be correctively referred to as the first component 12.

As illustrated in FIG. 3, the fan unit 15 comprises a fan case 15*b*, an impeller 15*c*, and a motor. The fan case 15*b* is provided with a vent 15*a*. The impeller 15*c* is housed in the fan case 15*b*. The motor in also housed in the fan case 15*b* to rotate the impeller 15*c*.

The electronic device 1 comprises a housing 11. As illustrated in FIG. 1, the housing 11 houses a base 21 and a cover 22 attached to the upside of the base 21.

As illustrated in FIG. 2, the cover 22 is provided with a keyboard supporter 22*a* that supports the keyboard 16. The keyboard supporter 22*a* has a cover opening 22*b* to expose the inside of the housing 11.

As illustrated in FIG. 1, the base 21 comprises a rectangular plate-like bottom wall 23 and a side wall 24 extending from the periphery of the bottom wall 23. The upside of the base 21 is an opening. The base 21 houses various components as described above (the circuit board 14 mounted with the memories 12A, the wireless module 12B, the fan unit 15, etc.). The fan unit 15 is located near the memories 12A and the wireless module 12B, and arranged around a corner 23*a* (see FIG. 3) among four corners of the bottom wall 23. More specifically, among four corners of the bottom wall 23, the fan unit 15 is arranged around one of a pair of corners, i.e., the corner 23*a*, on the side where the first body 2 is connected to the second body 3. As illustrated in FIGS. 3 and 5, a battery retainer 23*b* that holds a battery is provided on the bottom wall 23 of the base 21. The battery retainer 23*b* is located along a side 23*c* of the base 21. The side 23*c* is on the side where the first body 2 is connected to the second body 3. On the side opposite the side 23*c* where the battery retainer 23*b* is located, the first component 12 and the fan unit 15 are located. The height of the fan unit 15 from the bottom wall 23 is equal to or higher than the height of the first component 12 from the bottom wall 23.

Figure 4:
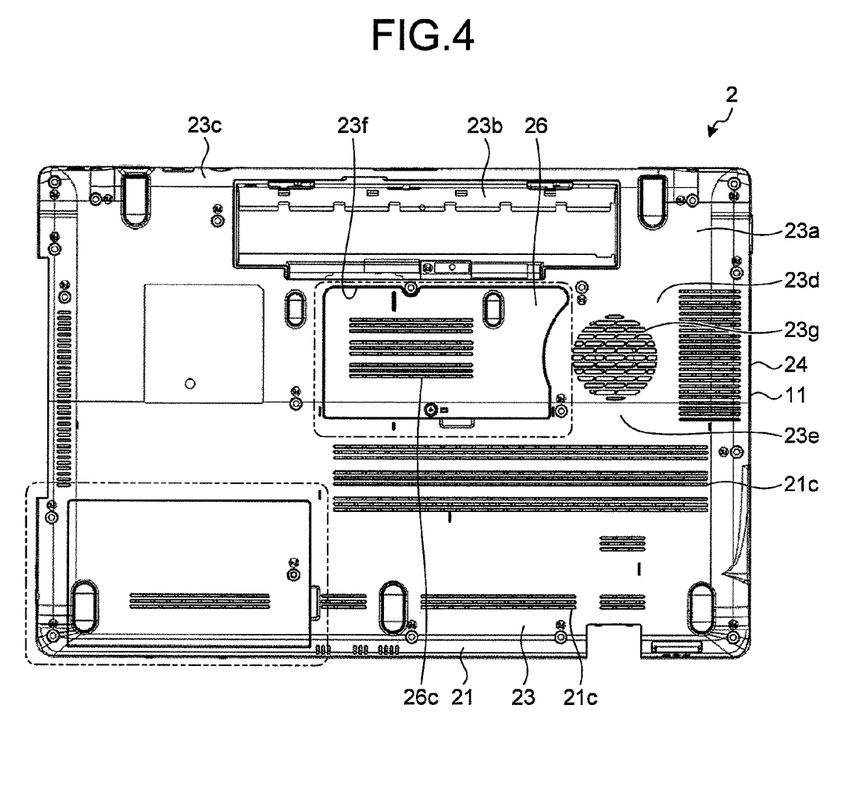
FIG. 4 is an exemplary view of the bottom of the first body in the first embodiment.

As illustrated in FIGS. 4 and 5, the bottom wall 23 has a wall portion 23*d* comprising a cover 23*e* and an opening 23*f*. The cover 23*e* covers the fan unit 15. The opening 23*f* is located around the periphery of the cover 23*e*. The fan unit 15 is fixed to the cover 23*e* with a fixing member such as a screw. A vent 23*g* is formed in the cover 23*e*. The fan unit 15 draws and discharges air through the vent 23*g*. Another vent 21*c* is formed in the base 21. The fan unit 15 ventilates the housing 11 through the vents 23*g* and 21*c*, and a vent 26*c* formed in a lid 26, which will be described later. Thus, the heat of the components is discharged out of the housing 11.

As illustrated in FIG. 4, the opening 23*f* is covered by the lid 26. A stopper 23*i* and a receiver 23*j* are formed on the periphery of the opening 23*f*. The receiver 23*j* is formed in a stepped shape. Meanwhile, the lid 26 is provided with a hook 26*a*. The lid 26 is screwed to the bottom wall 23 with a screw 26*b* while the hook 26*a* engages the stopper 23*i* so that the lid 26 is fixed to the bottom wall 23. By unscrewing the lid 26 and detaching the hook 26*a* from the stopper 23*i*, the lid 26 can be removed from the bottom wall 23.

Figure 8:
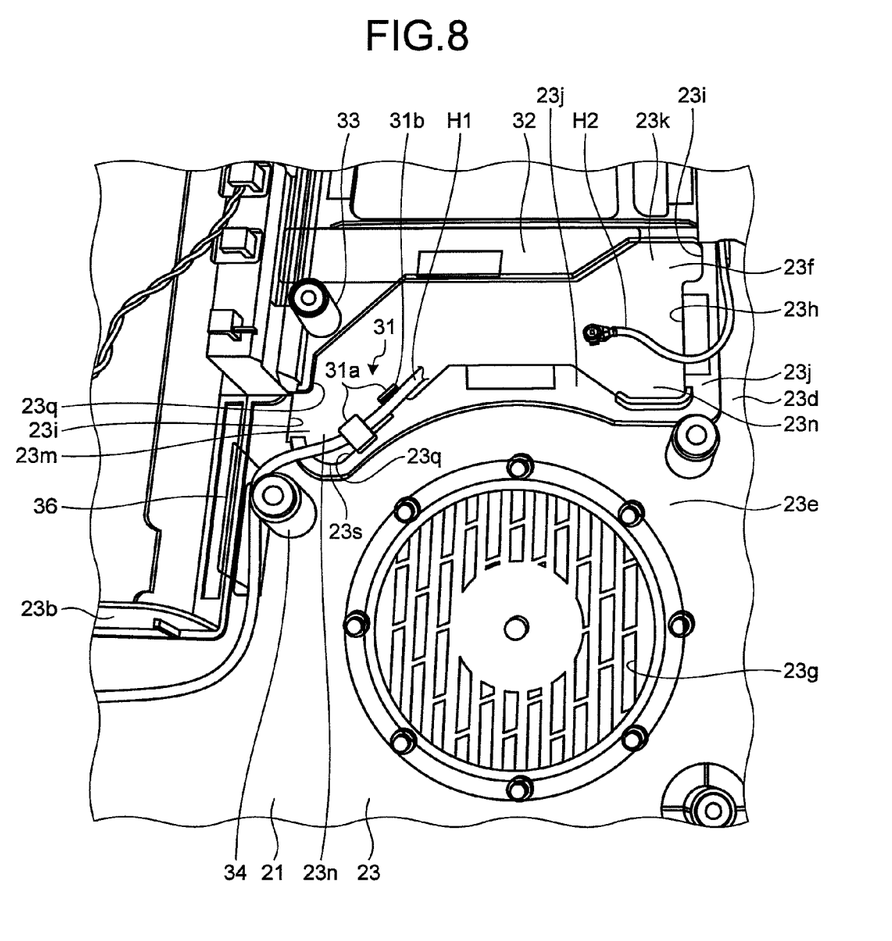
FIG. 8 is an exemplary perspective view of part of the bottom of a housing viewed from the above in the first embodiment.

As illustrated in FIGS. 5 and 8, in the housing 11, a wiring H1, which is connected to a component in the housing 11, is installed around the fan unit 15. The wiring H1 is held around the fan unit 15 by a wiring holder 31 provided in the housing 11. The wiring H1 is routed across the first body 2 and the second body 3 partly along the hinge mechanism 4. The wiring H1 connects the wireless module 12B of the first body 2 and an antenna built in the second body 3.

Figure 7:
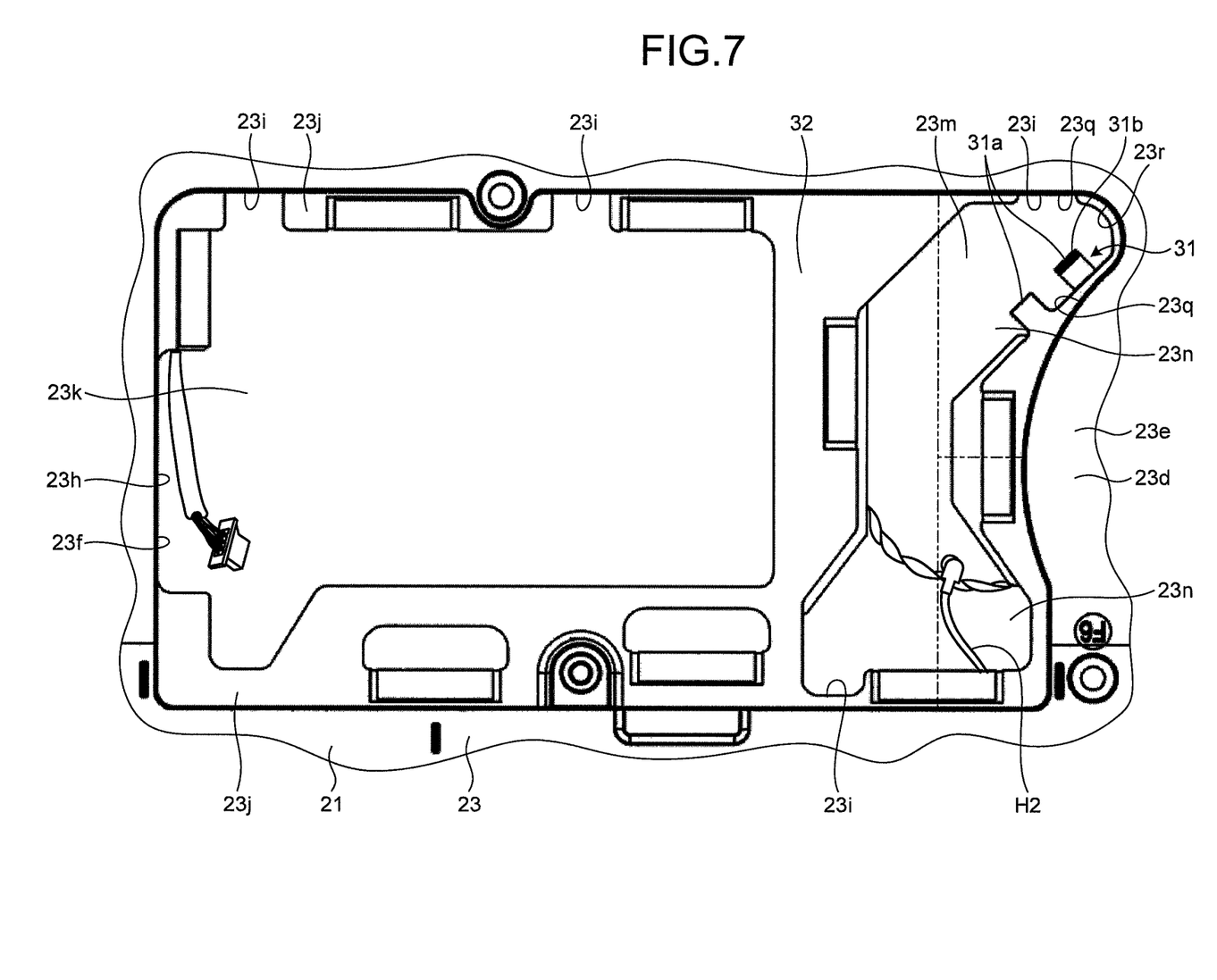
FIG. 7 is an exemplary enlarged view of an opening on the bottom of the first body from which the cover is removed in the first embodiment.

The wiring holder 31 comprises a pair of hooks 31*a* that hold the wiring H1 between them. The hooks 31*a* are arranged spaced apart from each other along the route of the wiring H1. As illustrated in FIGS. 7 and 8, the hooks 31*a* are bent at their ends to form hooking portions 31*b*, respectively. The hooks 31*a* are located at positions so that the hooking portions 31*b* extend in opposite directions. The hooks 31*a* extend from a periphery 23*h* of the opening 23*f* at positions opposite the opening 23*f* in the direction in which the opening 23*f* passes through the wall portion 23*d* of the bottom wall 23.

A description will now be given of the opening 23*f* in the wall portion 23*d* of the bottom wall 23.

As illustrated in FIGS. 5 and 7, the opening 23*f* comprises a first area 23*k* and a second area 23*m*. The first component 12 is exposed in the first area 23*k*. The second area 23*m* is located around the cover 23*e* continuously from the first area 23*k*. The periphery of the wiring holder 31 is exposed in the second area 23*m*. In FIGS. 5 and 7, the boundary between the first area 23*k* and the second area 23*m* is indicated by an alternate long and two short dashed line.

The first area 23*k* is formed in the shape of a rectangle having a size larger than the outer peripheral size of the first component 12. A reinforcing member 32 is provided in the housing 11 to face part of the area of the opening 23*f*. The reinforcing member 32 is fixed to the bottom wall 23.

The second area 23*m* extends along the outer periphery of the fan unit 15 from the first area 23*k*. More specifically, as illustrated in FIGS. 5, 7, and 8, the second area 23*m* comprises a pair of protruding portions 23*n* protruding with respect to the first area 23*k*. In FIGS. 5 and 7, the boundary between the protruding portions 23*n* is indicated by an alternate long and short dash line. Part of the cover 23*e* is located between the protruding portions 23*n*. One of the protruding portions 23*n* is formed around the cover 23*e* continuously from the first area 23*k*, and the periphery of the wiring holder 31 is exposed therein. Meanwhile, a wiring H2 is exposed in the other of the protruding portions 23*n*. The wiring H2 is also connected to the wireless module 12B. The one of the protruding portions 23*n* is larger in area than the other. The one of the protruding portions 23*n* is provided with a pair of edges 23*q* and a connection edge 23*r* at the periphery, i.e., the periphery of the second area 23*m*. The edges 23*q* faces each other, and the connection edge 23*r* connects between the edges 23*q*. One of the edges 23*q* is provided with the wiring holder 31, while the other is provided with the stopper 23*i*.

The bottom wall 23 is provided with a first boss 33 on the inner surface at the periphery of the second area 23*m* of the opening 23*f*. The first boss 33 supports the circuit board 14. More specifically, the circuit board 14 is screwed to the first boss 33. The first boss 33 is provided to the other of the edges 23*q*.

The bottom wall 23 is further provided with a second boss 34 on the inner surface. The second boss 34 supports the cover 22. More specifically, a pin formed on the back surface of the cover 22 is fitted in the second boss 34. The second boss 34 is located around a top portion 23s of the one of the protruding portions 23n in the second area 23m of the opening 23f. The one of the protruding portions 23n is located closer to the edge of the first body 2 on the side where the first body 2 is connected to the second body 3 compared to the other.

The area between the first component 12 and the fan unit 15 as the second component is communicated with the second area 23m of the opening 23f.

In this structure, as illustrated in FIG. 8, the wiring H1, which passes from the second body 3 through where the first body 2 is connected to the second body 3 and extends to the first body 2, is routed such that it passes beside the hinge mechanism 4 and the side of the second boss 34 opposite the fan unit 15 while held by the wiring holder 31 and connecting to the wireless module 12B (connected portion is not illustrated). In this manner, the wiring H1 is routed across the first body 2 and the second body 3, and is routed along the hinge mechanism 4 as a connector in the middle of the wiring route. As illustrated in FIG. 5, the wiring H1 has a portion routed along the periphery of the fan unit 15 and exposed from the second area 23m. As being held by the wiring holder 31, the wiring H1 is prevented from interfering with the fan unit 15. As illustrated in FIG. 8, a sheet 36 is provided to prevent the slide between the wiring H1 and another wiring (not illustrated).

That is, the electronic device 1 comprises components (such as the memories 12A, the wireless module 12B, etc.), the fan case 15b, and the housing 11. The housing 11 houses the components and the fan case 15b. The electronic device 1 further comprises the wall portion 23d and the wirings H1 and H2. The wall portion 23d is part of the bottom wall 23 of the housing 11 and has the opening 23f where the components are exposed. The periphery 23h of the opening 23f extends along the periphery of the fan case 15b. The wirings H1 and H2 are routed along the periphery of the fan case 15b, and partly exposed from the opening 23f.

As described above, according to the first embodiment, the second area 23m is formed in the opening 23f to expose around the wiring holder 31. With this, wiring work to attach the wiring H1 to the wiring holder 31 can be performed from the outside of the bottom wall of the housing 11. Further, since the second area 23m is communicated with the first area 23k where the first component is exposed, the wiring H1 can be attached to the wiring holder 31 also in the first area 23k in addition to the second area 23m. In other words, the wiring H1 can be attached to the wiring holder 31 in a larger area, the wiring work for the wiring H1 inside the housing 11 can be performed relatively easily from the outside of the bottom wall 23.

According to the first embodiment, the area between the first component 12 and the fan unit 15 as the second component is communicated with the second area 23m of the opening 23f. Accordingly, the wiring work for the wiring H1 can be performed also in between the first component 12 and the fan unit 15. Thus, the wiring work for the wiring H1 inside the housing 11 can be performed further easily from the outside of the bottom wall 23.

According to the first embodiment, the electronic device 1 comprises the lid 26 that covers the opening 23f and the stopper 23i that is located at the periphery 23h of the second area 23m to lock the lid 26. The wall portion 23d of the bottom wall 23 is provided with the edges 23q that faces each other at the periphery 23h of the second area 23m. One of the edges 23q is provided with the wiring holder 31, while the other is provided with the stopper 23i. That is, the stopper 23i is located separate from the wiring holder 31. This prevents the stopper 23i from being caught by the user's hand or the like while the user is performing the wiring work.

According to the first embodiment, the electronic device 1 comprises the first boss 33 at the periphery 23h of the second area 23m. The wiring holder 31 is formed at the one of the edges 23q, while the first boss 33 is formed at the other. That is, the first boss 33 is located separate from the wiring holder 31. This prevents the first boss 33 from being caught by the user's hand or the like while the user is performing the wiring work.

According to the first embodiment, the electronic device 1 comprises the second boss 34. The second area 23m protrudes with respect to the first area 23k. The second boss 34 is provided to the wall portion 23d around the top portion 23s of the one of the protruding portions 23n in the second area 23m. That is, the second boss 34 is located on the back side from the second area 23m with respect to the first area 23k. This prevents the second boss 34 from being caught by the user's hand or the like while the user is performing the wiring work.

According to the first embodiment, the electronic device 1 comprises the first body 2 provided with the housing 11 and the second body 3 provided with the display device 17 and is connected to the first body 2. The wiring H1 is routed across the first body 2 and the second body 3. Thus, the wiring work for the wiring H1 routed across the first body 2 and the second body 3 can be easily performed using the first area 23k and the second area 23m.

According to the first embodiment, the wiring holder 31 comprises the hooks 31a that hold the wiring H1 between them. The hooks 31a extend from the periphery 23h of the opening 23f at positions opposite the opening 23f in the direction in which the opening 23f passes through the wall portion 23d. With this, the user can easily visually check the hooks 31a through the opening 23f, which further facilitates the wiring work for the wiring H1.

According to the first embodiment, the wiring H2 is also exposed in the second area 23m of the opening 23f. Thus, the wiring work for the wiring H2 can also be easily performed.

A description will be given of an electronic device according to a second embodiment with reference to FIGS. 9 and 10.

Figure 9:
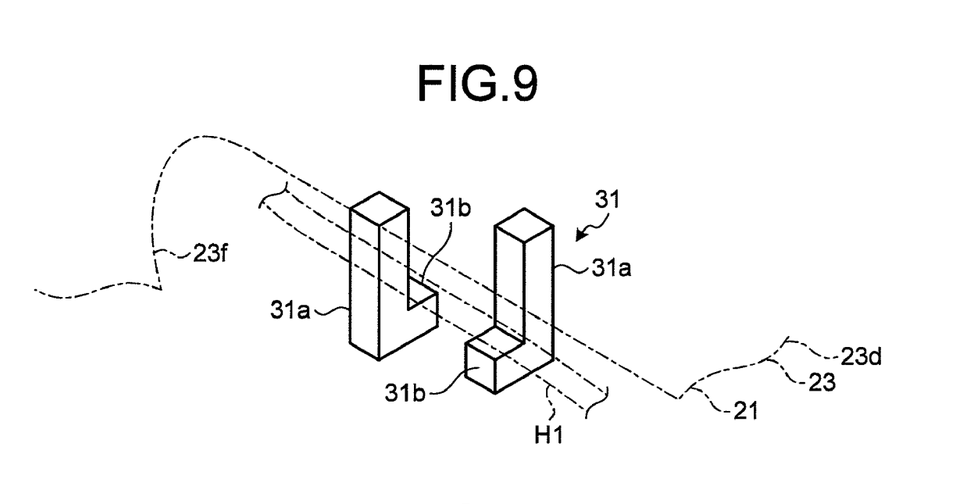
FIG. 9 is an exemplary perspective view of a wiring holder viewed from below the bottom according to a second embodiment.
Figure 10:
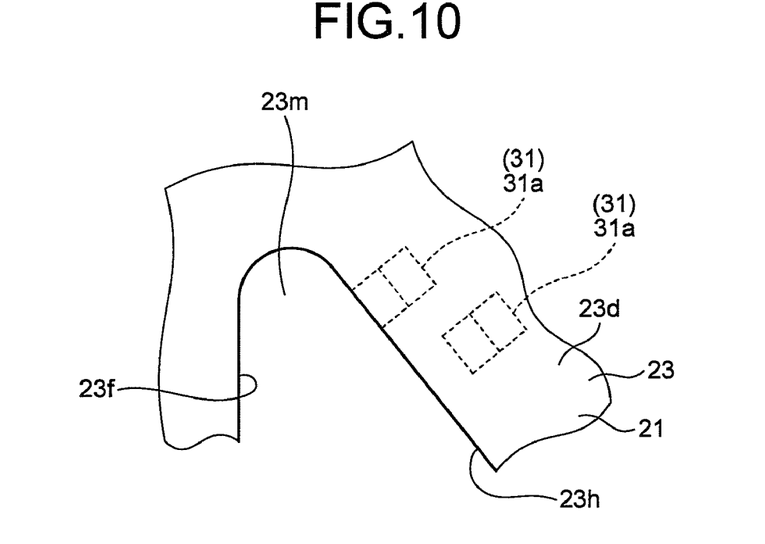
FIG. 10 is an exemplary view of part of the bottom wall where the wiring holder is located in the second embodiment.

As illustrated in FIGS. 9 and 10, in the second embodiment, the hooks 31a of the wiring holder 31 are modified from that of the first embodiment. The hooks 31a of the second embodiment are vertically provided at the periphery 23h of the opening 23f along the direction in which the opening 23f passes through the wall portion 23d. This prevents, for example, the user or the like from touching the hooks 31a.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a housing configured to house a plurality of components comprising a first component and a second component located near the first component;
   a wiring mounted adjacent the second component in the housing and connected to at least one of the first and second components;

a wiring holder located around the second component in the housing, the wiring holder configured to hold the wiring;
a wall portion comprising a cover that covers the second component and an opening, the opening comprising a first area where the first component is exposed and a second area where a periphery of the wiring holder is exposed, the second area being positioned around the cover continuously from the first area; and
a second boss, wherein
the second area protrudes with respect to the first area, and
the second boss is provided to the wall portion around a top portion of a protruding portion of the second area.

2. An electronic device comprising:
a housing comprising a wall portion provided with an opening;
a first component in the housing and exposed from the opening;
a second component in the housing and located near the first component;
a wiring routed around the second component in the housing; and
a wiring holder located around the second component in the housing, the wiring holder configured to hold the wiring,
wherein the wall portion comprises a cover that covers the second component,
wherein the opening comprises a first area where the first component is exposed and a second area where a periphery of the wiring holder is exposed, the first area having a shape of a rectangle in a size larger than an outer peripheral size of the first component, the second area positioned around the cover and extending along a periphery of the second component from the first area, and
wherein the wiring comprises a portion routed along the periphery of the second component and exposed from the second area.

3. The electronic device of claim 2, wherein an area between the first component and the second component is connected to the second area.

4. The electronic device of claim 2, further comprising:
a lid configured to cover the opening; and
a stopper located at a periphery of the second area to lock the cover, wherein
the wall portion comprises a first edge and a second edge that face each other at the periphery of the second area, and
the first edge comprises the wiring holder, while the second edge comprises the stopper.

5. The electronic device of claim 2, further comprising a first boss at a periphery of the second area, wherein
the wall portion comprising a first edge and a second edge that face each other at the periphery of the second area, and
the first edge is provided with the wiring holder, while the second edge is provided with the first boss.

6. The electronic device of claim 2, wherein a height of the second component from the wall portion is equal to or higher than a height of the first component from the wall portion.

7. The electronic device of claim 2, wherein
the wiring holder comprises a pair of hooks that hold the wiring therebetween, and
the hooks extend from a periphery of the opening at positions opposite the opening in a direction in which the opening passes through the wall portion.

8. The electronic device of claim 2, wherein
the wiring holder comprises a pair of hooks that hold the wiring therebetween, and
the hooks are vertically provided at a periphery of the opening along a direction in which the opening passes through the wall portion.

9. An electronic device comprising:
a housing configured to house a plurality of components comprising a first component and a second component located near the first component;
a wiring installed around the second component in the housing and connected to at least one of the first and second components;
a wiring holder located around the second component in the housing, the wiring holder configured to hold the wiring;
a wall portion comprising a cover that covers the second component and an opening, the opening comprising a first area where the first component is exposed and a second area where a periphery of the wiring holder is exposed, the second area being positioned around the cover continuously from the first area, wherein
the second area comprises a first protruding portion and a second protruding portion protruding with respect to the first area, and
a portion of the cover is located between the first protruding portion and the second protruding portion.

10. The electronic device of claim 9, wherein the first protruding portion is larger in area than the second protruding portion.

11. The electronic device of claim 10, further comprising:
a first body provided with the housing; and
a second body provided with a display device and is connected to the first body, wherein
the wiring is routed across the first body and the second body, and
the first protruding portion is located closer to an edge of the first body on a side where the first body is connected to the second body compared to the second body.

12. The electronic device of claim 11, further comprising a connector configured to rotatably connect the first body and the second body, wherein
the wiring is routed along the connector.

13. An electronic device comprising:
a component;
a fan case located near the component;
a housing configured to house the component and the fan case;
a wall portion that is a portion of a bottom wall of the housing, the wall portion comprising an opening to expose the component, which comprises a periphery extending along a periphery of the fan case;
a wiring routed along the periphery of the fan case in the housing and partly exposed from the opening; and
a wiring holder located around the fan case in the housing, the wiring holder configured to hold the wiring,
wherein the wall portion comprises a cover that covers the fan case, and
wherein the opening comprises a first area where the component is exposed and a second area where a periphery of the wiring holder is exposed, the second area positioned around the cover continuously from the first area.

* * * * *